United States Patent
Breuninger

(10) Patent No.: US 7,549,670 B2
(45) Date of Patent: Jun. 23, 2009

(54) LATERAL AIRBAG DEVICE

(75) Inventor: Martin Breuninger, Neu-Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/806,665

(22) Filed: Jun. 1, 2007

(65) Prior Publication Data
US 2007/0296188 A1    Dec. 27, 2007

Related U.S. Application Data

(63) Continuation of application No. PCT/DE2005/002194, filed on Dec. 1, 2005.

(30) Foreign Application Priority Data

Dec. 3, 2004 (DE) .................. 10 2004 058 564

(51) Int. Cl.
*B60R 21/20* (2006.01)
(52) U.S. Cl. ..................... 280/729; 280/730.2
(58) Field of Classification Search .............. 280/730.2, 280/749, 729
See application file for complete search history.

(56) References Cited

U.S. PATENT DOCUMENTS

| 6,135,493 | A | 10/2000 | Jost et al. |
| 6,170,860 | B1 | 1/2001 | Denz et al. |
| 6,540,253 | B2 | 4/2003 | Acker et al. |
| 6,755,436 | B2 * | 6/2004 | Hess et al. ............ 280/730.2 |
| 6,817,626 | B2 | 11/2004 | Boll et al. |
| 7,040,651 | B2 | 5/2006 | Bossecker et al. |
| 2003/0178831 | A1 | 9/2003 | Roberts et al. |
| 2004/0119270 | A1 | 6/2004 | Gu et al. |
| 2006/0071458 | A1 | 4/2006 | Sendelbach et al. |

FOREIGN PATENT DOCUMENTS

| DE | 297 09 389 U1 | 11/1997 |
| DE | 198 20 568 A1 | 11/1999 |
| DE | 198 24 601 C2 | 12/1999 |
| DE | 199 34 245 A1 | 1/2001 |
| DE | 199 30 157 A1 | 4/2001 |
| DE | 100 63 766 A1 | 6/2002 |
| DE | 100 63 765 A1 | 7/2002 |
| DE | 102 20 364 A1 | 4/2003 |
| DE | 102 23 830 A1 | 1/2004 |
| DE | 102 37 574 A1 | 2/2004 |
| EP | 0 955 213 B1 | 11/1999 |
| EP | 1 145 921 A2 | 10/2001 |
| GB | 2362139 A | 11/2001 |
| WO | WO 2004/101327 A1 | 11/2004 |

* cited by examiner

*Primary Examiner*—Eric Culbreth
(74) *Attorney, Agent, or Firm*—Foley & Lardner LLP

(57) ABSTRACT

A lateral airbag device for a vehicle includes a head airbag which, in the event of an accident of said vehicle, provides impact protection for the head of the occupant of a vehicle. The head airbag has two head chambers in order to protect the head. A first head chamber curbs the movement of the head caused by the accident when said accident occurs and a second head chamber supports the first head chamber. The first head chamber is more permeable to gas than the second head chamber.

20 Claims, 20 Drawing Sheets

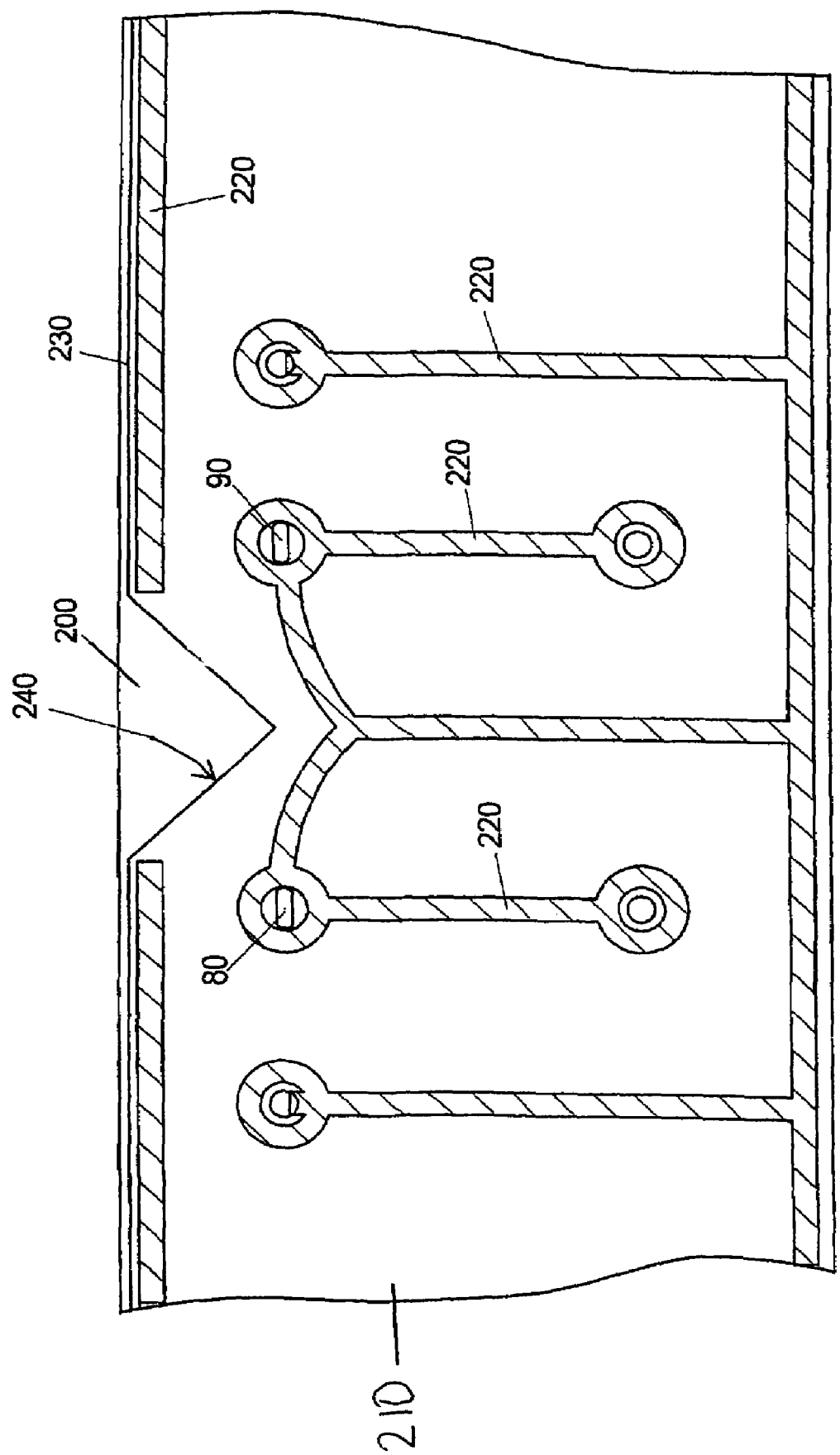

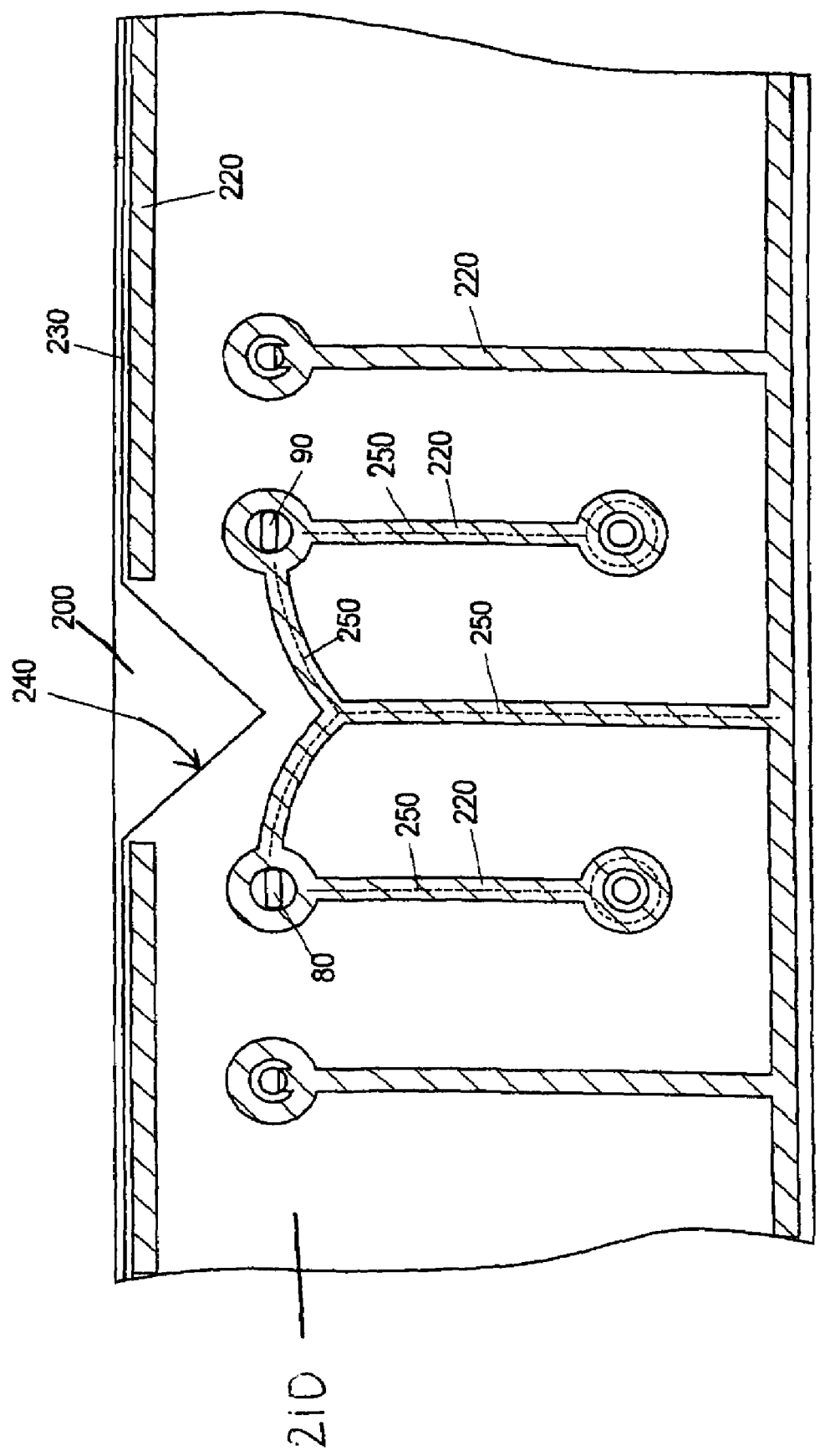

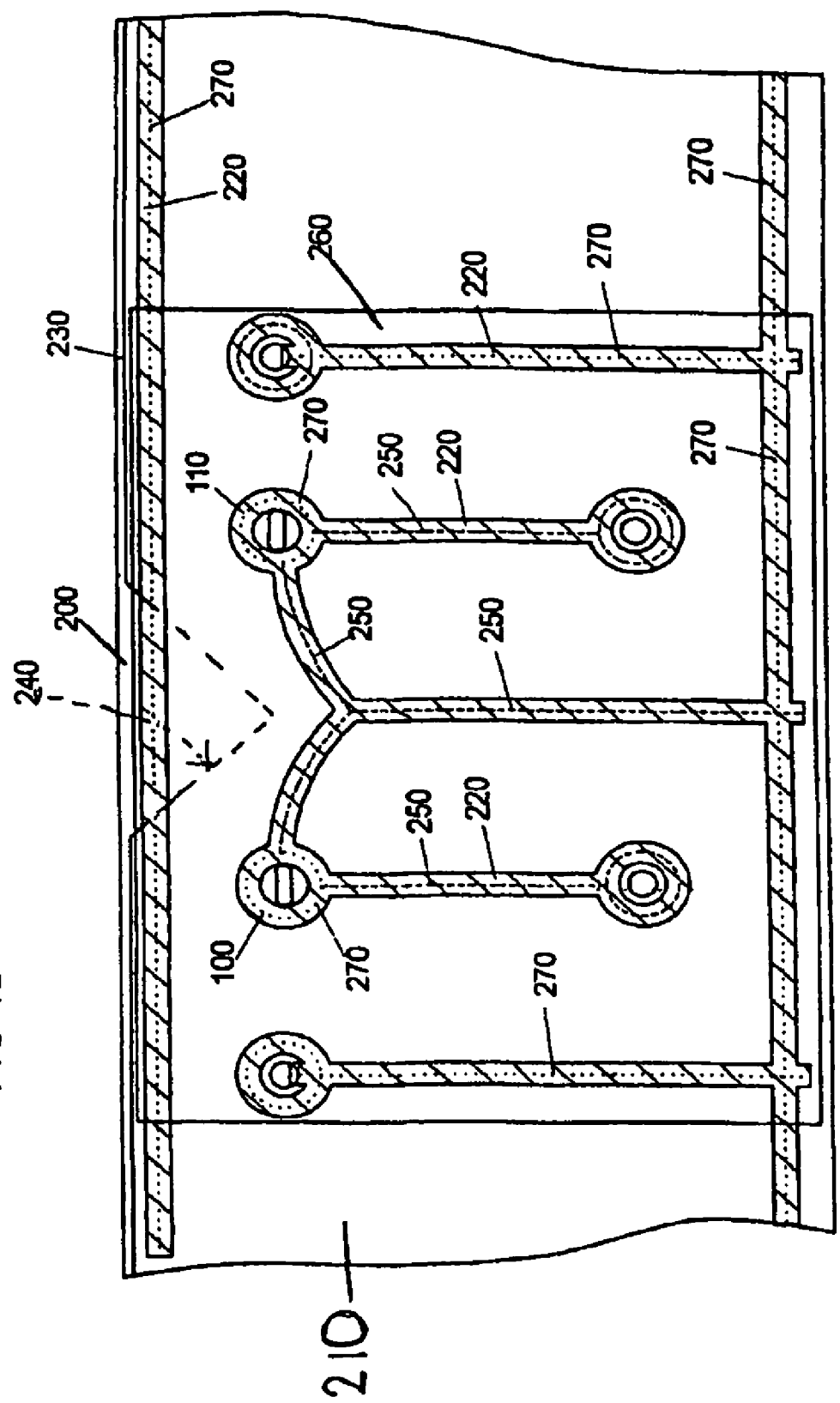

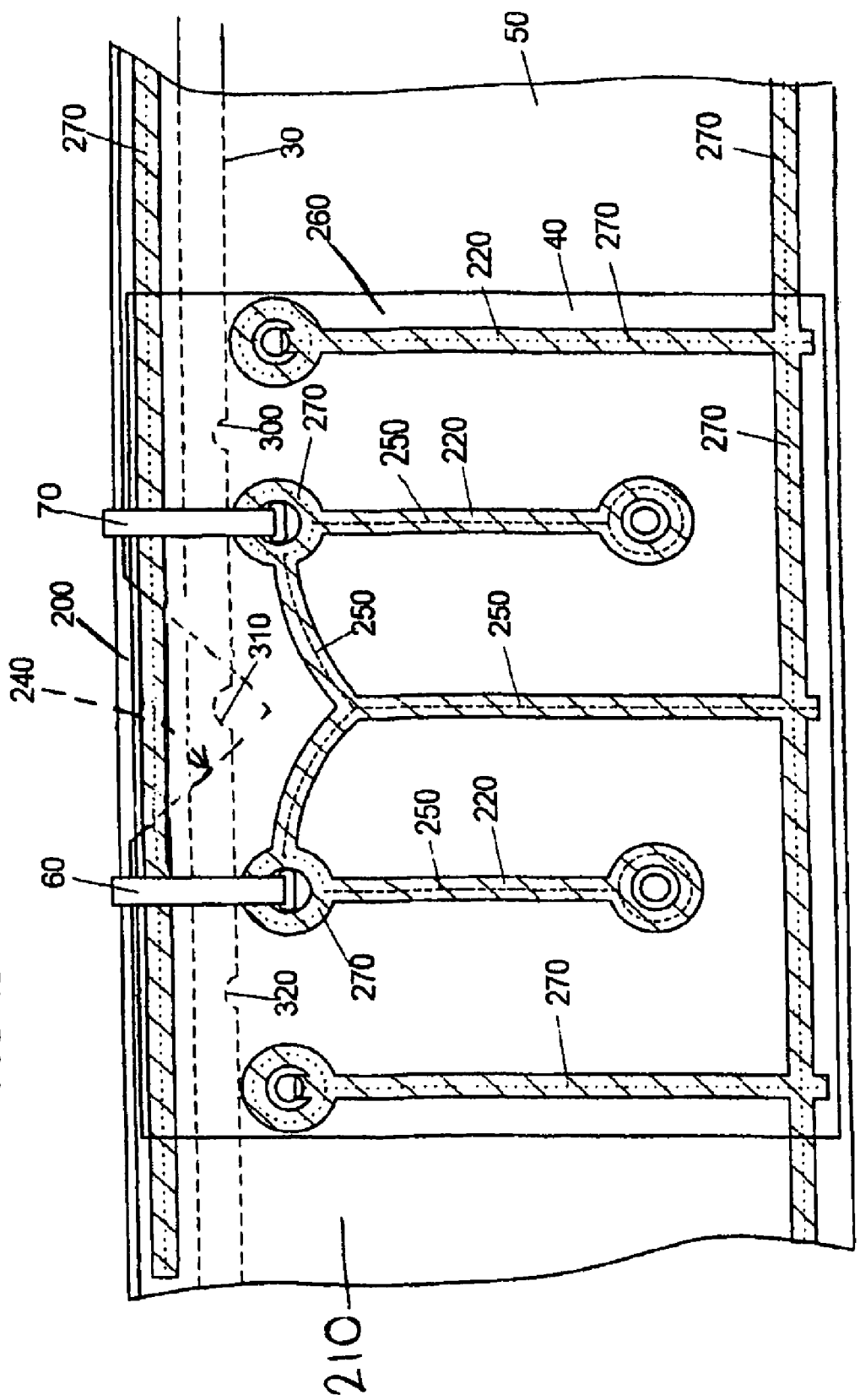

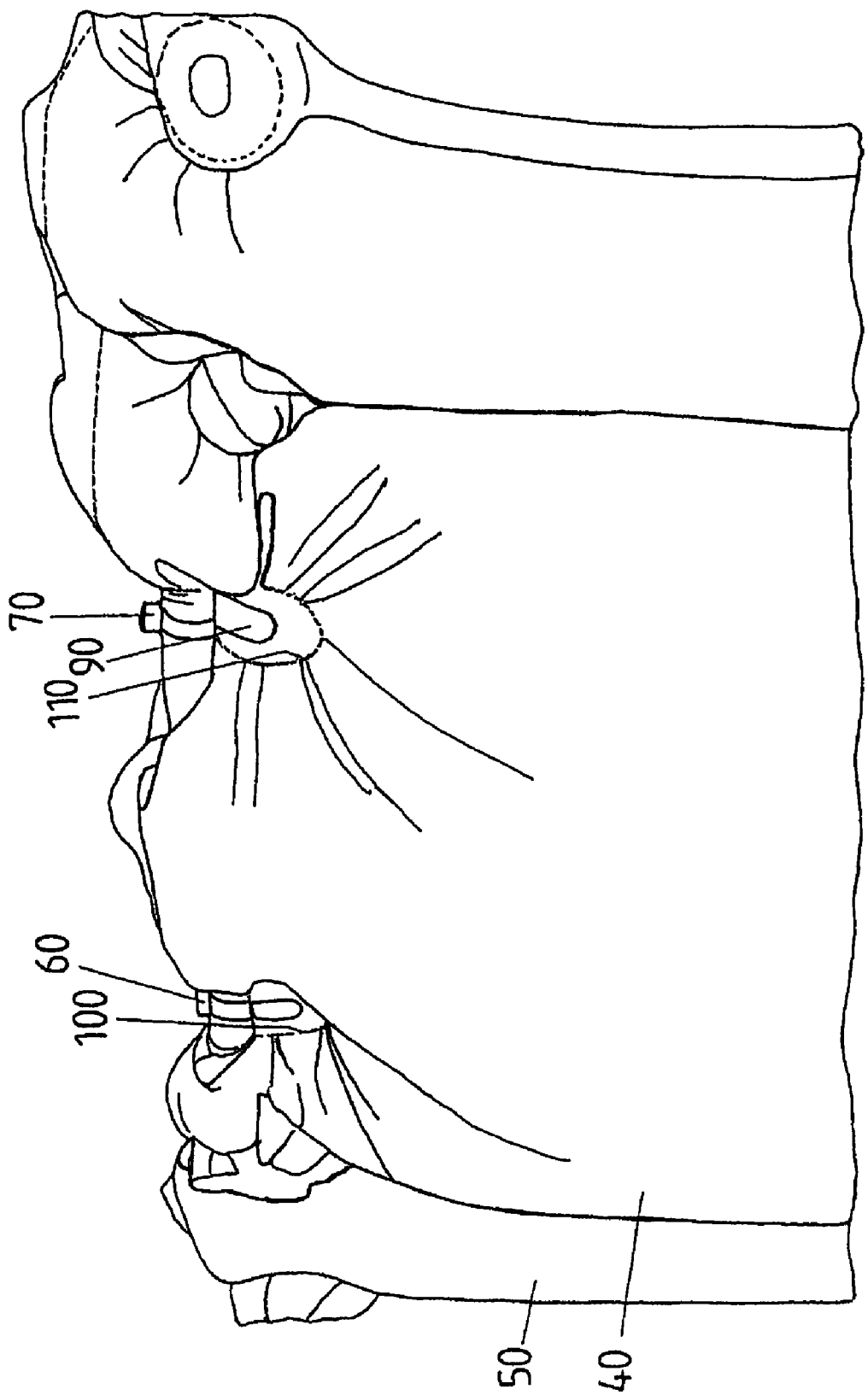

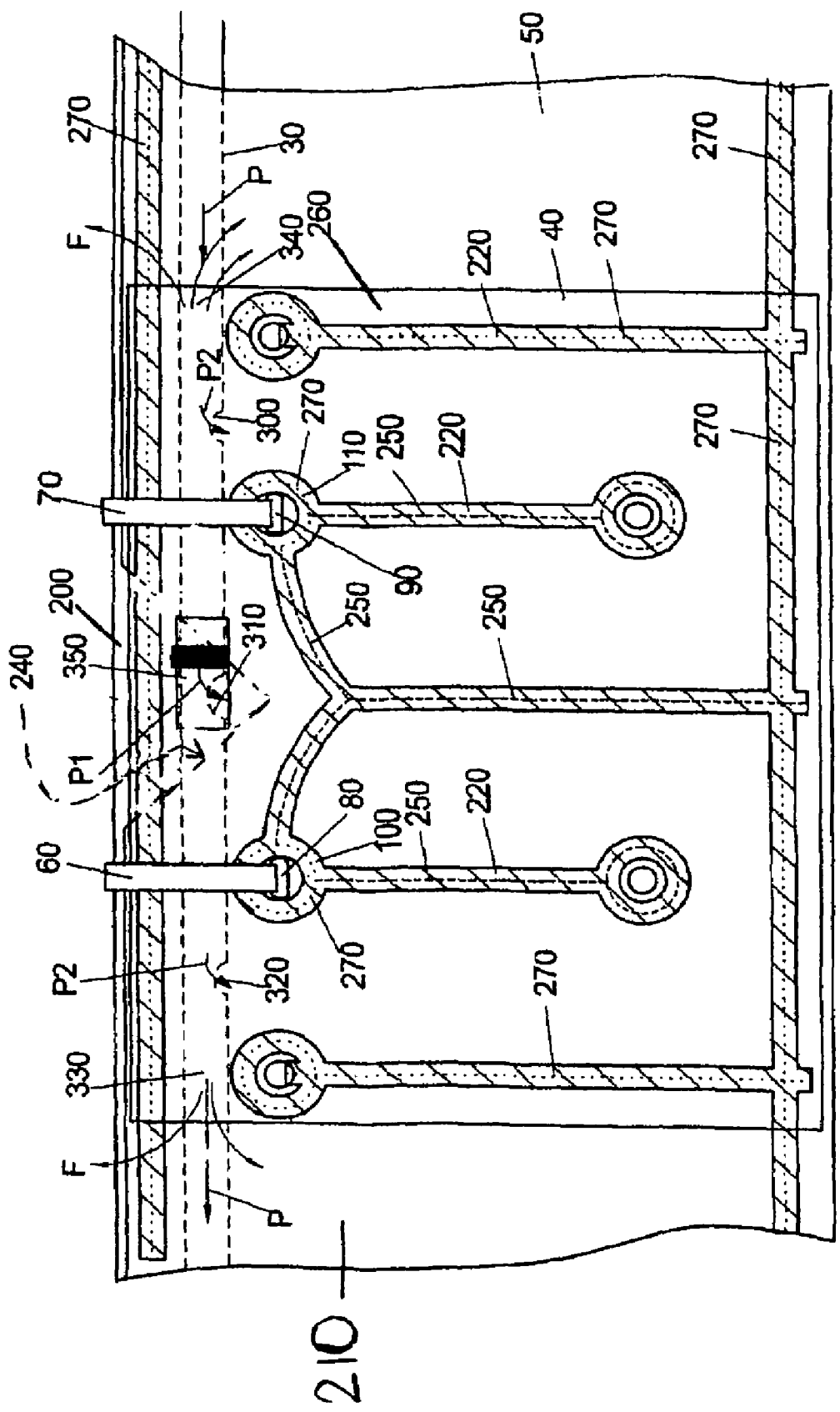

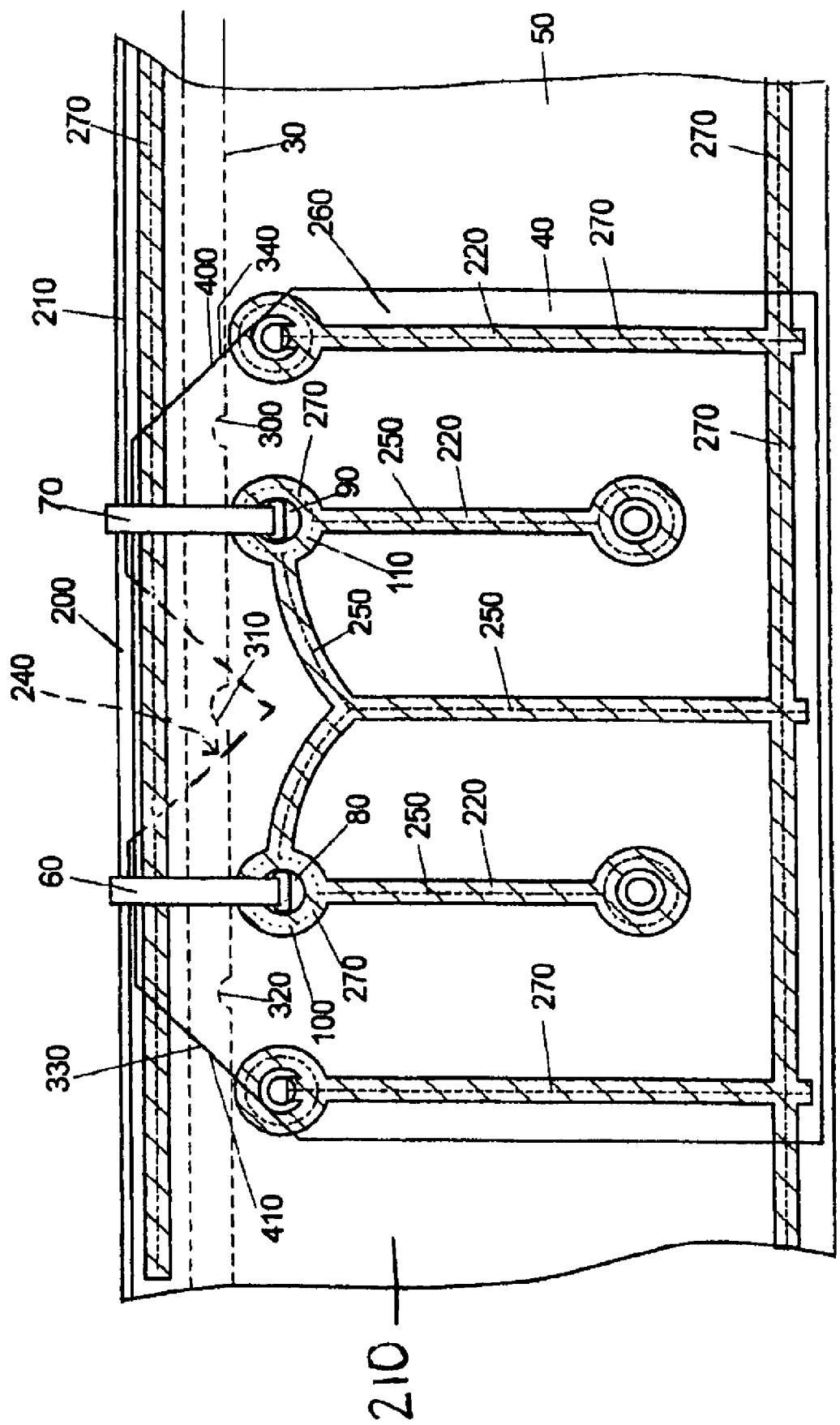

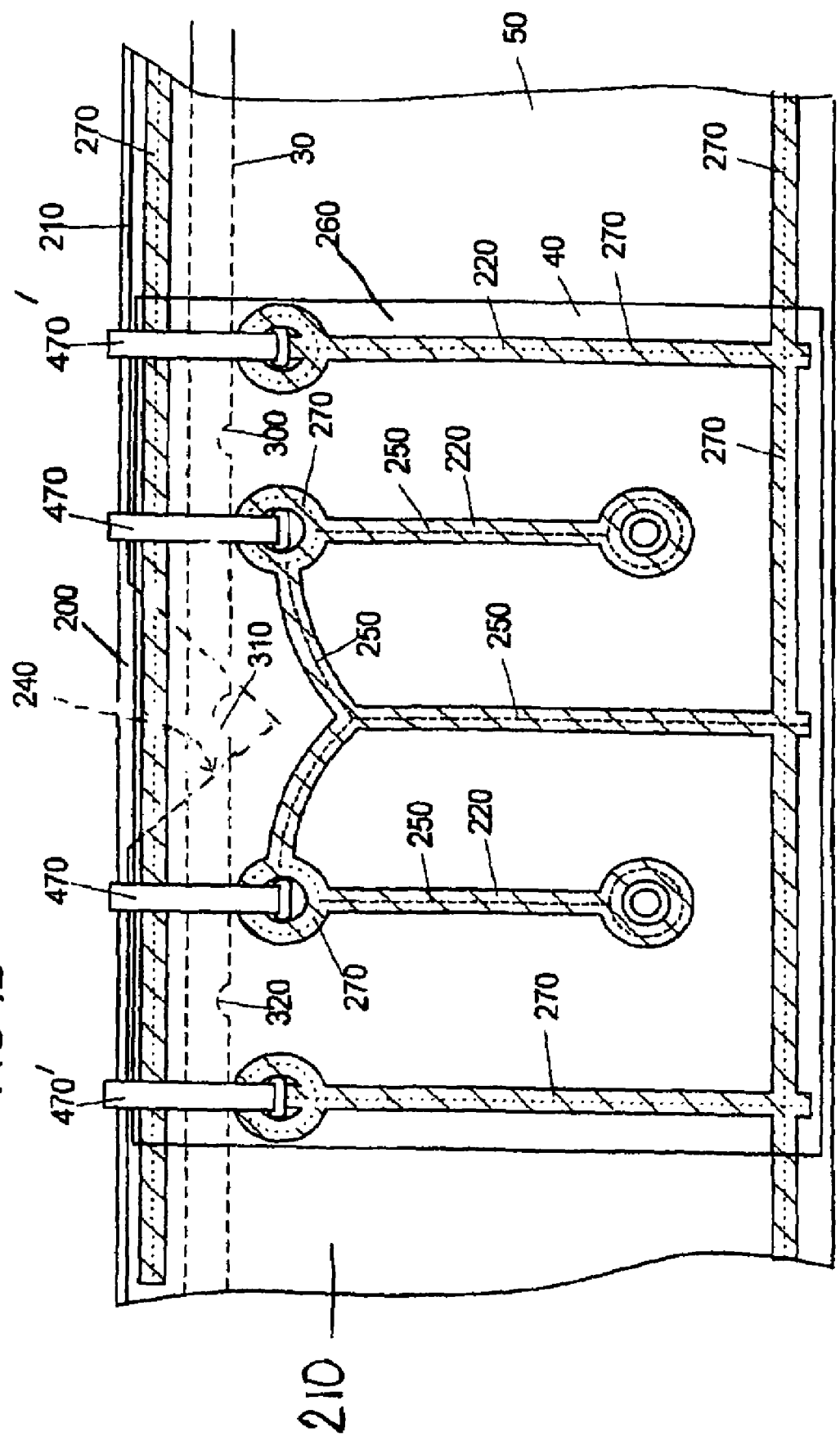

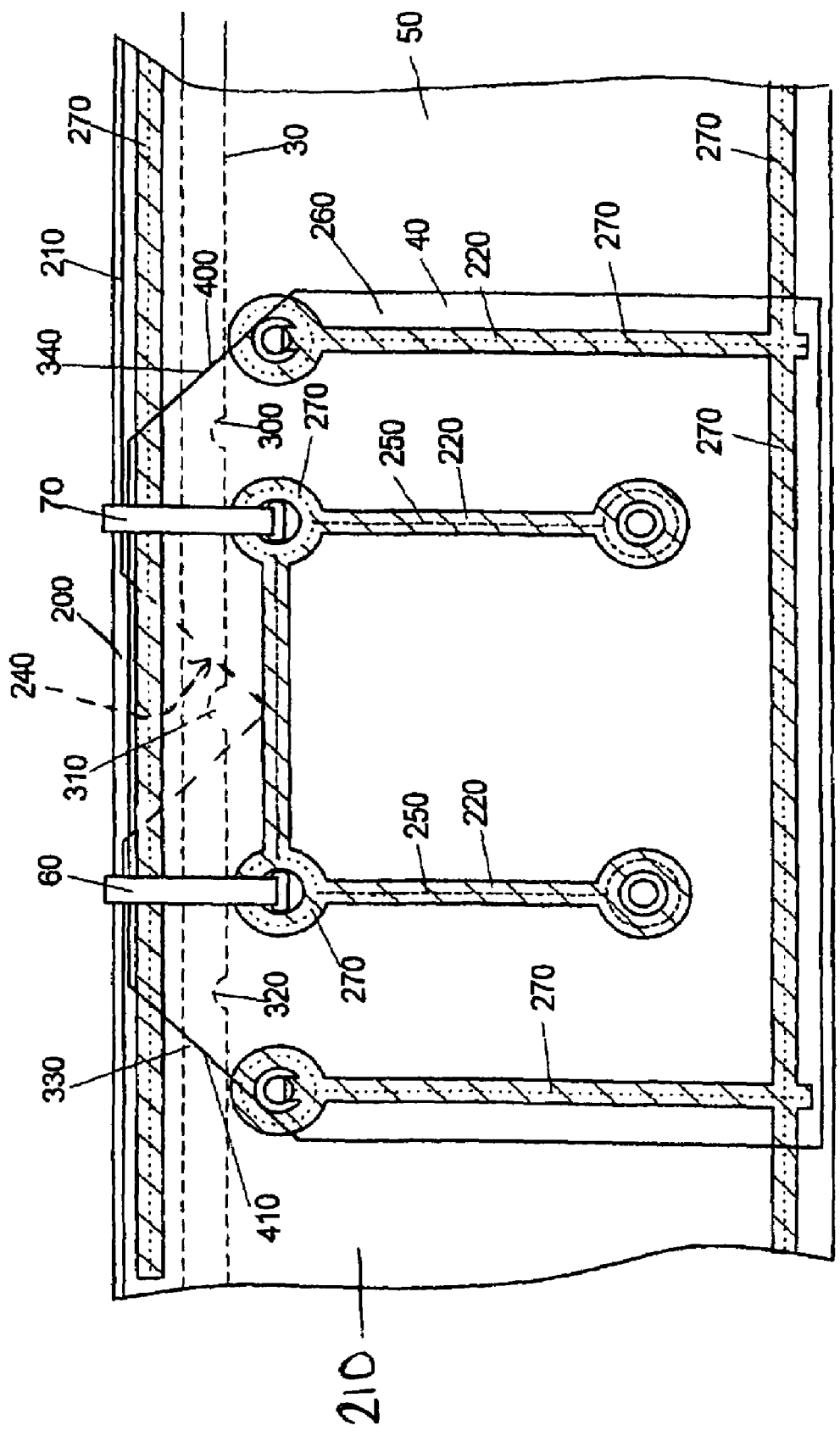

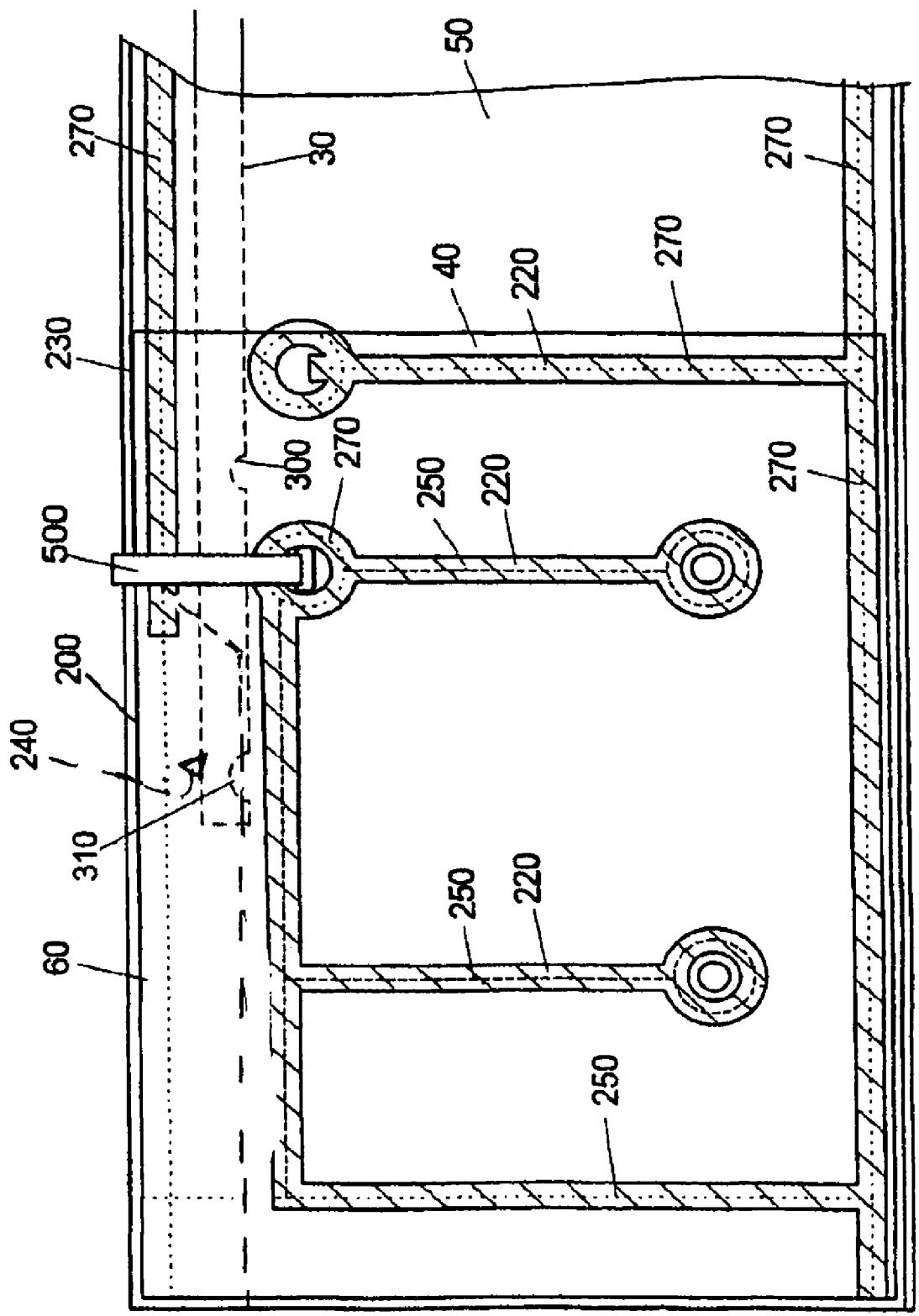

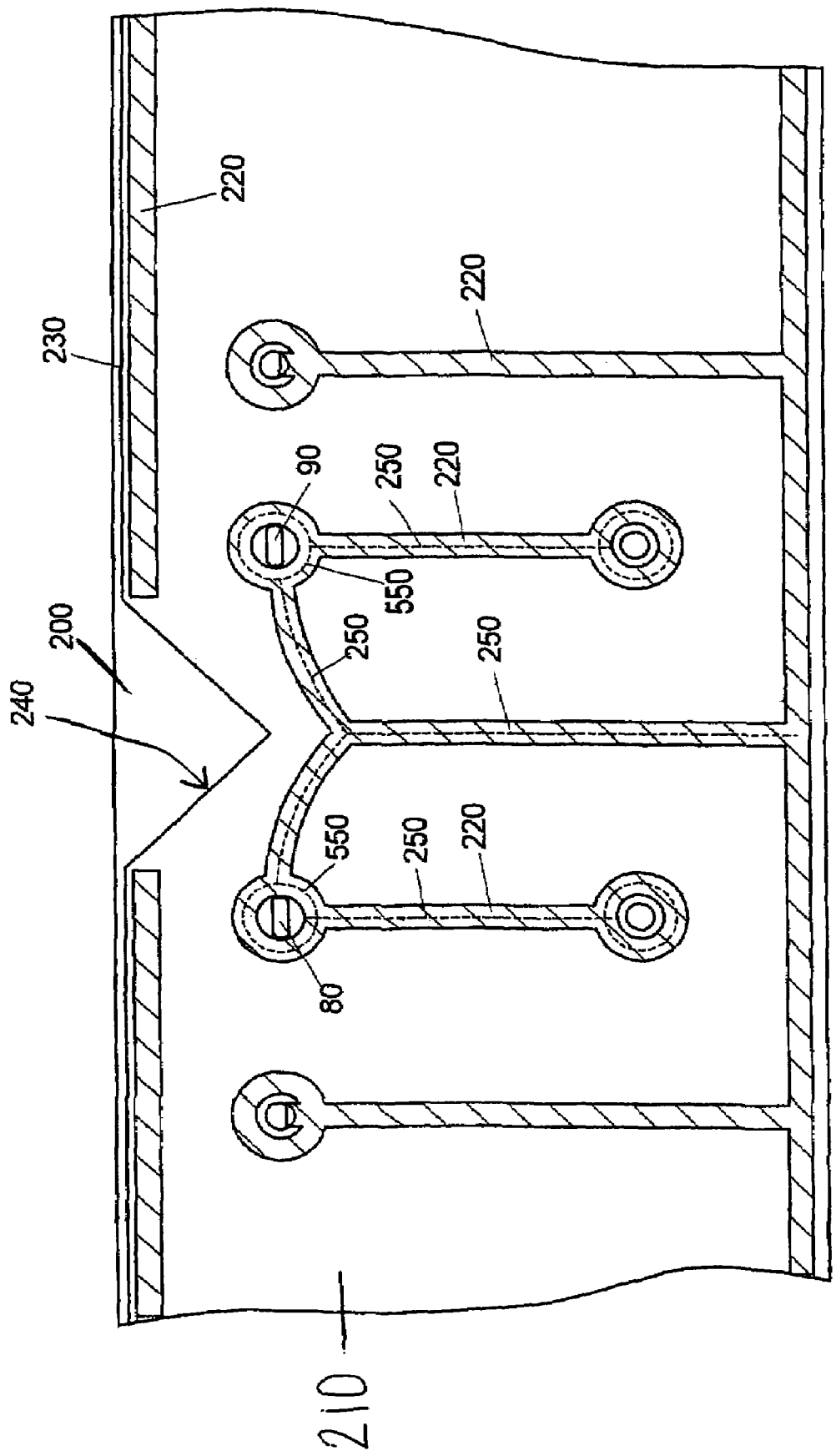

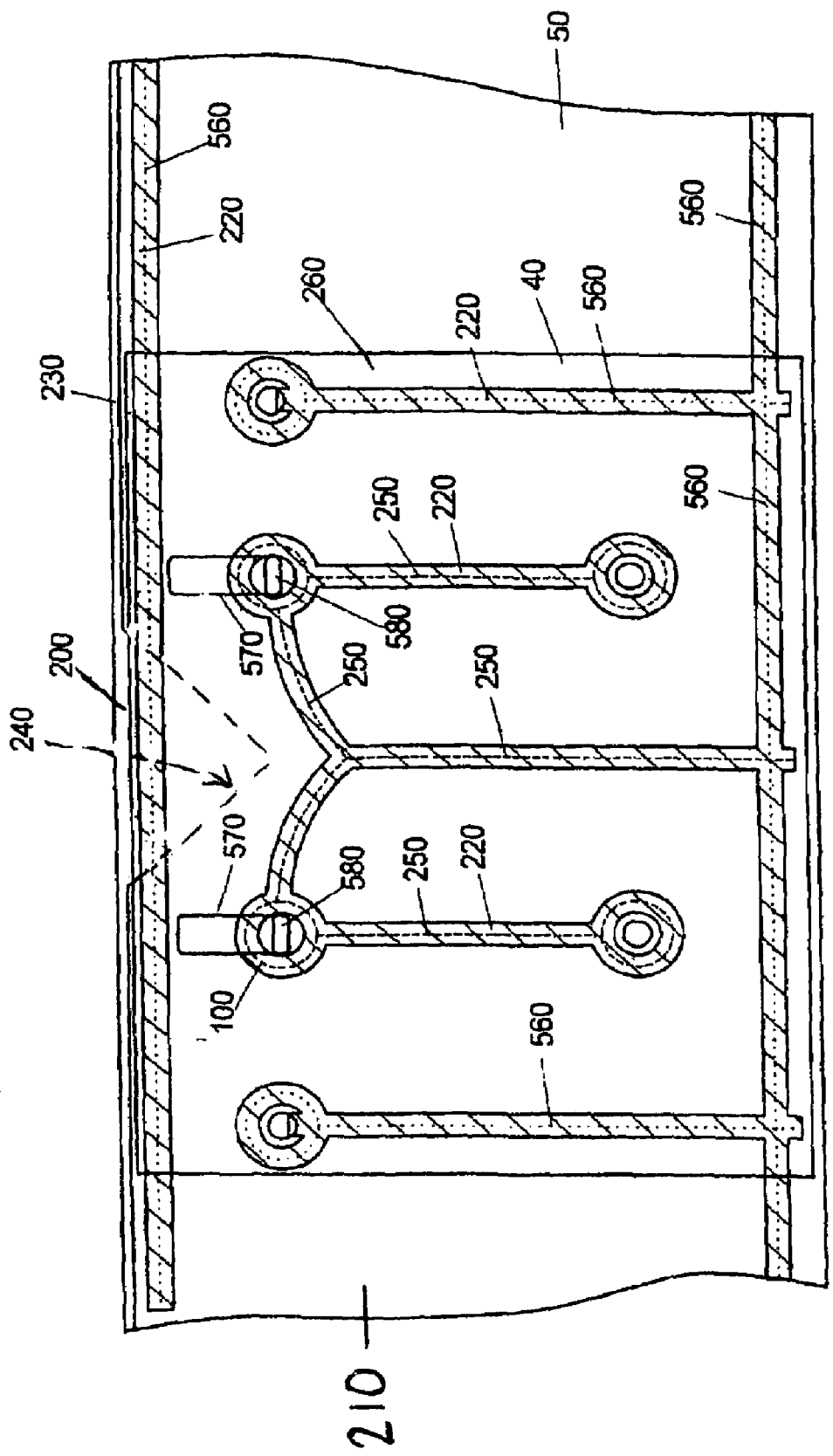

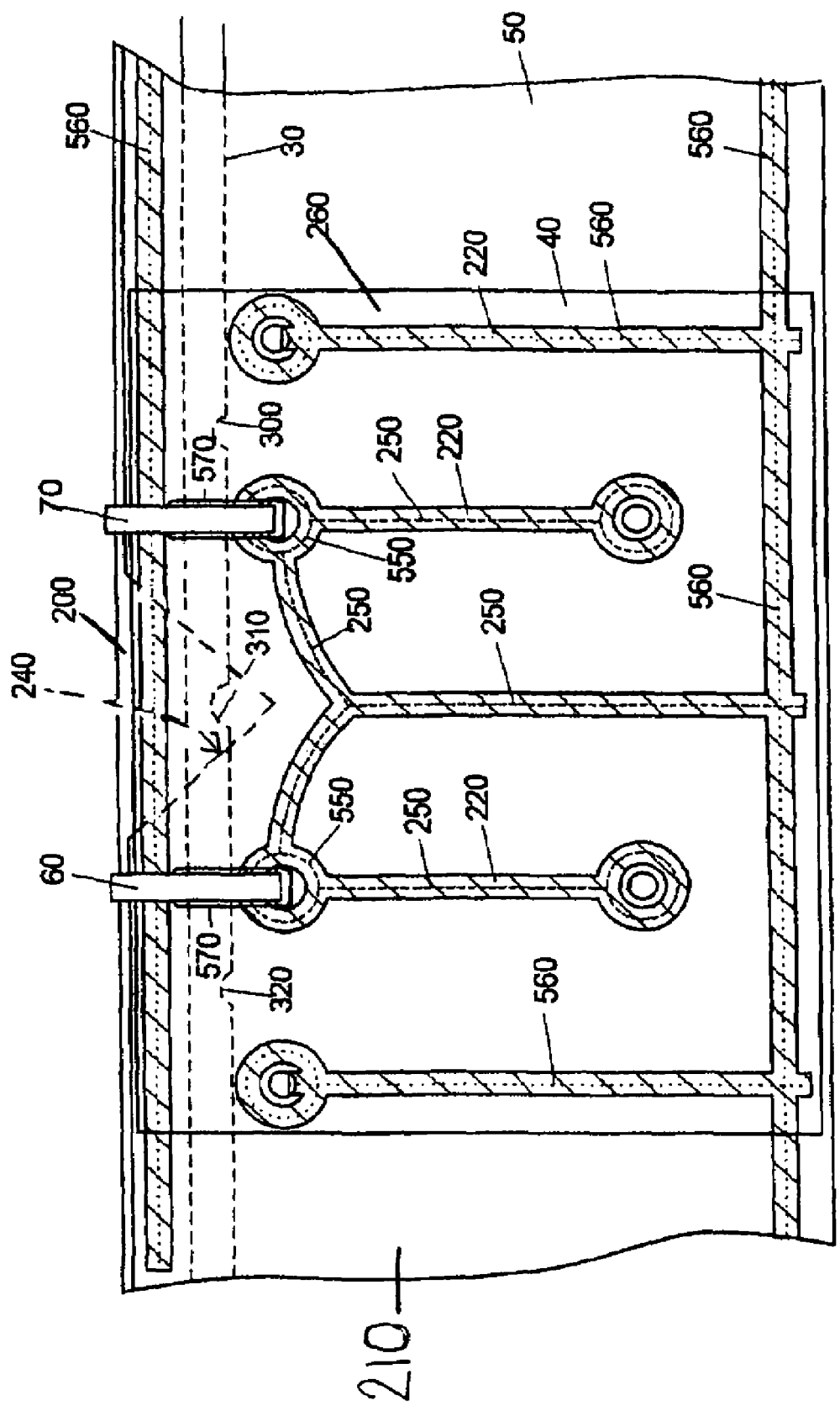

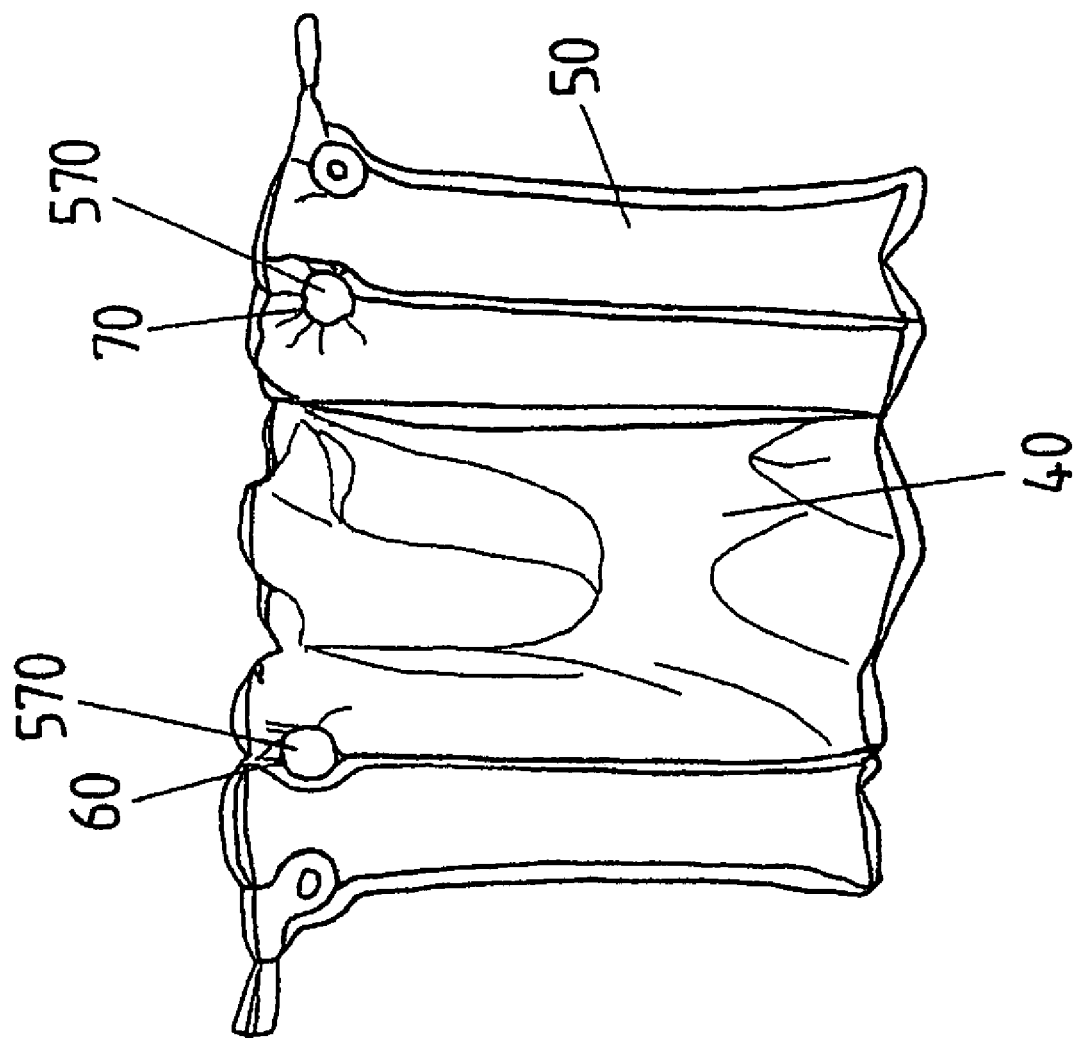

LATERAL AIRBAG DEVICE

CROSS-REFERENCE TO RELATED PATENT APPLICATIONS

This application is a continuation of International Application PCT/DE 2005/002194, which has an international filing date of Dec. 1, 2005; this International Application was not published in English, but was published in German as WO 2006/058534, both of which are incorporated herein by reference in their entirety.

BACKGROUND

The invention relates to a lateral airbag device for a vehicle, with a head airbag which, in the event of an accident of the vehicle, brings about lateral impact protection for a vehicle occupant's head.

A lateral airbag device of this type is known from German laid-open specification DE 19930157 A1. This lateral airbag device has two airbag chambers which protect the vehicle occupant in the event of an accident of the vehicle. One of these airbag chambers is formed by a "head chamber" which serves specifically to protect the vehicle occupant's head. The second chamber—"thorax chamber"—serves to protect the vehicle occupant's upper body when the occupant plunges into the thorax chamber because of an accident.

SUMMARY

One embodiment relates to a lateral airbag device for a vehicle. The airbag device comprises a head airbag which, in the event of an accident of the vehicle, brings about lateral impact protection for a vehicle occupant's head. The head airbag comprises at least two head chambers. A first head chamber is configured to brake an accident-induced movement of the head. A second head chamber supports the first head chamber. The first head chamber is more gas-permeable than the second head chamber.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1B-1E illustrate steps for producing the lateral airbag device according to FIG. 1A.

FIG. 1G shows a further three-dimensional illustration of the lateral airbag device according to FIG. 1A.

FIG. 2 shows a second exemplary embodiment of a lateral airbag device with a valve.

FIGS. 3A and 3B show production steps for producing a third exemplary embodiment of a lateral airbag device.

FIGS. 4A and 4B show production steps for producing a fourth exemplary embodiment of a lateral airbag device.

FIG. 5 shows a fifth exemplary embodiment of a lateral airbag device.

FIG. 6 shows a sixth exemplary embodiment of a lateral airbag device.

FIGS. 7A-7E show production steps for producing a seventh exemplary embodiment of a lateral airbag device.

DETAILED DESCRIPTION

Figure 1A:
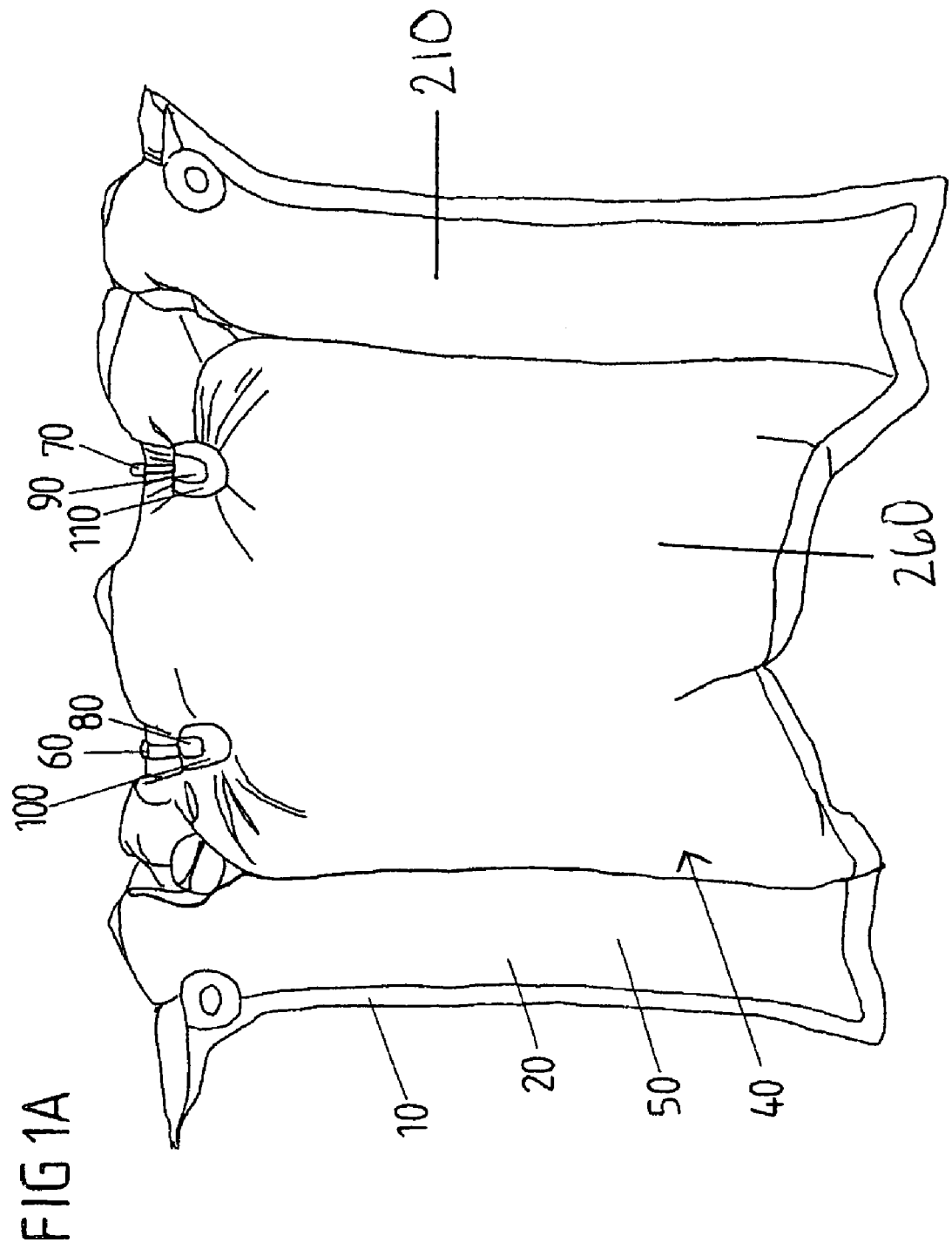
FIG. 1A shows a three-dimensional illustration of a first exemplary embodiment.

Embodiments are based on an object of improving a lateral airbag device of the previously known type to the effect that even better protection of the vehicle occupant than hitherto is achieved. In particular, it is to be ensured that a vehicle occupant's head is adequately protected in all phases of an accident of the vehicle.

According thereto, an embodiment makes provision for the head airbag for protecting the vehicle occupant's head to have at least two head chambers, and, in the event of an accident, one of the two head chambers, which is called first head chamber below, braking the accident-induced movement of the head. A further head chamber, which is called second head chamber below, supports the first head chamber. This second head chamber is designed to be less gas-permeable than the first head chamber.

A substantial advantage of the lateral airbag device according to an embodiment can be seen in the fact that, by means of the two-chamber construction of the head airbag, particularly comprehensive protection of the vehicle occupant is achieved. Owing to the fact that the first head chamber is designed to be more gas-permeable than the second head chamber, the vehicle occupant can be effectively protected in all phases of an accident, namely both in a first phase of an accident of the vehicle and in the subsequent second accident phase: the protection in the first accident phase ("first-impact phase") is provided by the first head chamber which brakes the vehicle occupant's head after the onset of an accident. The first head chamber is designed to be gas-permeable, and therefore, when the head plunges into the head airbag during the first accident phase, it is possible for gas to exit from the first head chamber; the head is therefore very effectively braked and "kinetic energy" is dissipated. In the course of the subsequent second accident phase, in which, for example, a "roll-over phase" of the vehicle may occur, the second head chamber protects the vehicle occupant, since, in contrast to the first "more gas-permeable" head chamber, the second head chamber still remains filled with gas even in the second accident phase and protects the vehicle occupant by means of lateral cushion protection. In summary, the effect achieved by the two-chamber construction and by the combination of two differently gas-permeable head chambers is that the vehicle occupant's head is optimally protected in all phases of an accident of the vehicle.

For example, in the event of an accident, the first head chamber can be deployed, directly facing the head, in such a manner that, in the event of an accident, the head plunges directly into the first head chamber. In this case, the second head chamber is deployed facing away from the head. The second head chamber is preferably arranged downstream of the first head chamber—as seen in the striking direction of the head—in such a manner that, in a second accident phase following the first accident phase, it ensures lateral shielding of the head, in particular in the event of roll-over phases of the vehicle. The lateral airbag device therefore forms ideal protection for "first-impact" and "roll-over" accidents.

Alternatively, in the event of an accident, the first head chamber can be deployed facing away from the head; in this case, the second head chamber is deployed facing the head in such a manner that, in the event of an accident, the head plunges directly into the second head chamber. In this refinement of the lateral airbag device, the braking effect of the first head chamber is brought about by "mediation" of the second head chamber. For example, the second head chamber is arranged upstream of the first head chamber—as seen in the striking direction of the head—in such a manner that, in a second accident phase following the first accident phase, it ensures lateral shielding of the head, in particular in the event of roll-over phases of the vehicle.

The first head chamber is preferably gas-permeable and the second head chamber impermeable to gas. For example, the first head chamber has chamber openings which permit a gas flow to the outside and therefore permit a pressure loss.

In the event of an accident, the two head chambers can be filled separately from each other with gas and are therefore completely separated in terms of gas flow. Alternatively, the two head chambers can be connected to one and the same gas lance. In this case, the term "gas lance" is understood as meaning all types of connecting pipes or connecting pieces which produce a gas connection between a gas generator of the lateral airbag device and the head airbag. For example, the gas lance can be formed by a pipe or by a tube or the like, for example made of fabric or textile materials.

With regard to the gas flow being distributed into the two head chambers of the head airbag, the gas outlet openings of the gas lance are preferably each assigned exclusively to the first or the second head chamber.

The gas lance is preferably equipped with at least one valve with which the gas flow between the gas lance and the first head chamber and vice versa can be interrupted. A valve of this type affords the possibility of interrupting the gas flow into the first head chamber as soon as the first accident phase is finished and the first head chamber does not have to take on any further function. The effect which can be achieved by separating the gas flow between the gas lance and the first head chamber is that, after the first accident phase is finished, an undesirable loss of gas through the gas-permeable first head chamber is avoided.

For example, the valve can be closed when a predetermined gas pressure is reached in the first head chamber or when the gas pressure in the gas lance falls below a predetermined minimum pressure. The valve can be formed, for example—in a similar manner to conventional bicycle valves—by a pipe with holes in the pipe wall, which holes are covered by a sealing element—for example an elastic sleeve, for example a rubber sleeve, or by a tube or the like. If the pressure in the pipe interior (connection side for the gas generator) exceeds the ambient pressure outside the pipe (connection side for the first head chamber), then the gas will expand the sleeve or the tube counter to the restraining force thereof and will permit gas to exit through the holes in the wall; however, if the pressure in the gas generator is too low or the counter pressure of the first head chamber is too great, the sleeve or the tube remains closed and the valve is "bi-directionally" closed. A valve of this type permits a gas flow only in one direction of flow, namely from the gas generator to the first head chamber, and only if the described pressure conditions are present.

The valve for interrupting the gas flow between the gas lance and the first head chamber can alternatively be an electrically or pneumatically controlled valve. In order to activate the valve, use is preferably made of a control device which is connected to a pressure sensor which is fitted in the gas lance and/or in one head chamber and measures the gas pressure in the gas lance or in the first head chamber. With consideration of the particular pressure values of the pressure sensor, with which, inter alia, the end of the first accident phase can be recognized, the valve is closed by the control device as soon as the first accident phase is finished. Alternatively, the valve can also be closed in a time-controlled manner, for example after expiry of a predetermined period of time after the onset of the accident (beginning of the "second accident phase").

The head airbag can be formed, for example, by three material layers which are preferably sewn or adhesively bonded to one another. For example, a first material layer and a second material layer are connected to each other and form the second head chamber. A third material layer is connected to the second material layer and, with the latter, forms the first head chamber.

With regard to the gas-permeability of the first head chamber, the third material layer, for example, can be gas-permeable. Alternatively, the third material layer can be connected to the second material layer in such a manner that at least one gas exit hole is formed, through which gas from the first head chamber can exit to the outside.

The second material layer preferably has, along a side edge connected to the first and the third material layer, at least one material cutout which permits a gas flow to the first head chamber from a gas lance introduced between the first and the second material layer. The material cutout can be, for example, in the form of a V.

The third material layer is preferably essentially rectangular. Discharge openings are preferably provided in the region of two corners of this rectangle, said discharge openings permitting the gas to flow out of the first head chamber. With regard to increasing the discharge speed, the two corners of the rectangle may also be of beveled design.

If the gas lance is arranged between the first and the second material layer, then a gastight connection between the second head chamber and the gas lance can be achieved in a particularly simple and therefore advantageous manner by means of clamping connections which are guided through opening holes—for example insulated by means of seams—in the material layers and connect the gas lance fixedly to the three material layers.

Furthermore, it is considered advantageous if the outer shape and therefore the protective effect of the deployed first head chamber is influenced by at least one retaining strap. The at least one retaining strap can be fitted, for example, on the outside or inside of the first head chamber.

In conjunction with the figures, identical reference numbers are used for identical or comparable components.

FIG. 1A shows a lateral airbag device 10 with a head airbag 20 which, in the event of an accident, is inflated by gas of a gas generator (not illustrated in FIG. 1A). The gas passes from the gas generator (not illustrated) into the head airbag 20 via a gas lance 30.

The head airbag 20 has two head chambers, namely a first head chamber 40 and a second head chamber 50. The first head chamber 40 is arranged in such a manner that it directly faces the head of a vehicle occupant to be protected, to be precise in such a manner that, in the event of an accident, the vehicle occupant's head will plunge into this first head chamber 40. The first head chamber 40 is fastened, for example sewn, to the second head chamber 50; the second head chamber 50 holds or supports the first head chamber 40.

To fasten the head airbag 20 to the gas lance 30, use is made of two clamping straps 60 and 70 which are guided through passage holes 80 and 90 in the head airbag 20 and fasten the head airbag 20 to the gas lance 30. In order to avoid gas from being able to escape from the two head chambers 40 and 50 through the passage holes 80 and 90, the latter are sealed or insulated by means of circular seams 100 and 110.

As will become clear further below in conjunction with the description of the production of the head airbag 20, the first head chamber 40 is designed to be gas-permeable and the second head chamber 50 to be gas-impermeable. The effect achieved by the different configuration of the two head chambers 40 and 50 is that different accident phases over the course of the accident are taken into consideration: specifically, the first head chamber 40 serves to cover a first accident phase ("first-impact phase") in which the vehicle occupant's head plunges into the first head chamber 40. During the plunging-in process, gas will exit from the first head chamber 40, since the head chamber 40 is gas-permeable, as a result of which optimum braking of the head is achieved. Owing to the loss of gas, the protective effect of the first head chamber 40 is limited to the first accident phase of the accident. For the further action of the accident, for example for subsequent overturning events of the vehicle, use is made of the second head chamber 50 which is designed to be gas-impermeable and will maintain its gas pressure in an unchanged manner or at least in a largely unchanged manner even during the further action of the accident. Over the further course of the accident, the second head chamber 50 therefore also permits the vehicle occupant's head to be supported or shielded against striking against lateral vehicle parts, for example a side wall or the side window of the vehicle.

The production of the lateral airbag device 10 according to FIG. 1A is explained below with reference to FIGS. 1B to 1F. FIG. 1B shows a first material layer or first material panel 200 on which a second material layer or material panel 210 is placed. In subsequent production steps, the two material layers 200 and 210 are sewn to each other. In order to avoid gas from being able to exit at the seam locations, silicone is initially placed between the two material layers 200 and 210 in the region of the subsequent seams. Those locations of the material layers 200 and 210 which are coated with silicone are identified in FIG. 1B by reference numbers 220. In addition, the passage holes 80 and 90 which are present in the two material layers 200 and 210 can be seen in FIG. 1B.

As can be seen in FIG. 1B, the second material layer 210 has, along one of its side edges 230 connected to the first material layer 200, a material cutout 240 which is essentially configured in the shape of a V. The two material layers 200 and 210 form the second head chamber 50 of the head airbag 20.

FIG. 1C illustrates the two material layers 200 and 210 after they have been sewn to each other by means of seams 250. It can be seen that the regions with the passage holes 80 and 90 still remain unsewn.

FIG. 1D shows the two material layers 200 and 210 after a third material layer 260 has been placed onto the second material layer 210. The third material layer is essentially rectangular and is sewn both to the first material layer 200 and to the second material layer 210 by means of seams 270. The seams 270 also extend in regions outside the third material layer 260 and therefore also serve to connect the first material layer 200 to the second material layer 210 in regions outside the third material layer 260. The regions with the passage holes 80 and 90 are also sewn; the circular seams 100 and 110 already mentioned in FIG. 1A are formed.

FIGS. 1E and 1G show the three material layers 200, 210 and 260 after the gas lance 30 has been introduced between the first material layer 200 and the second material layer 210. In order to fasten the first material layer 200, 210 and 260, use is made of the two clamping straps 60 and 70 which ensure gastight connecting regions between the head airbag 20 and the gas lance 30.

As can be seen in FIG. 1E, the gas lance 30 has three gas outlet openings 300, 310 and 320. The two gas outlet openings 300 and 320 serve to inflate the second head chamber 50 of the head airbag 20, which chamber is formed by the first material layer 200 and the second material layer 210. The central gas outlet opening 310 of the gas lance 30 serves to inflate the first head chamber 40 which is formed by the third material layer 260 and the second material layer 210. So that the gas can pass from the gas exit opening 310 into the first head chamber 40, the material cutout 240 which is in the form of a V and has already been discussed in conjunction with FIG. 1B is provided in the second material layer 210; said material cutout 240 makes it possible for the gas to be able to pass out of the gas lance 30, which is arranged between the first material layer 200 and the second material layer 210, into the region between the second material layer 210 and the third material layer 260.

Figure 1F:
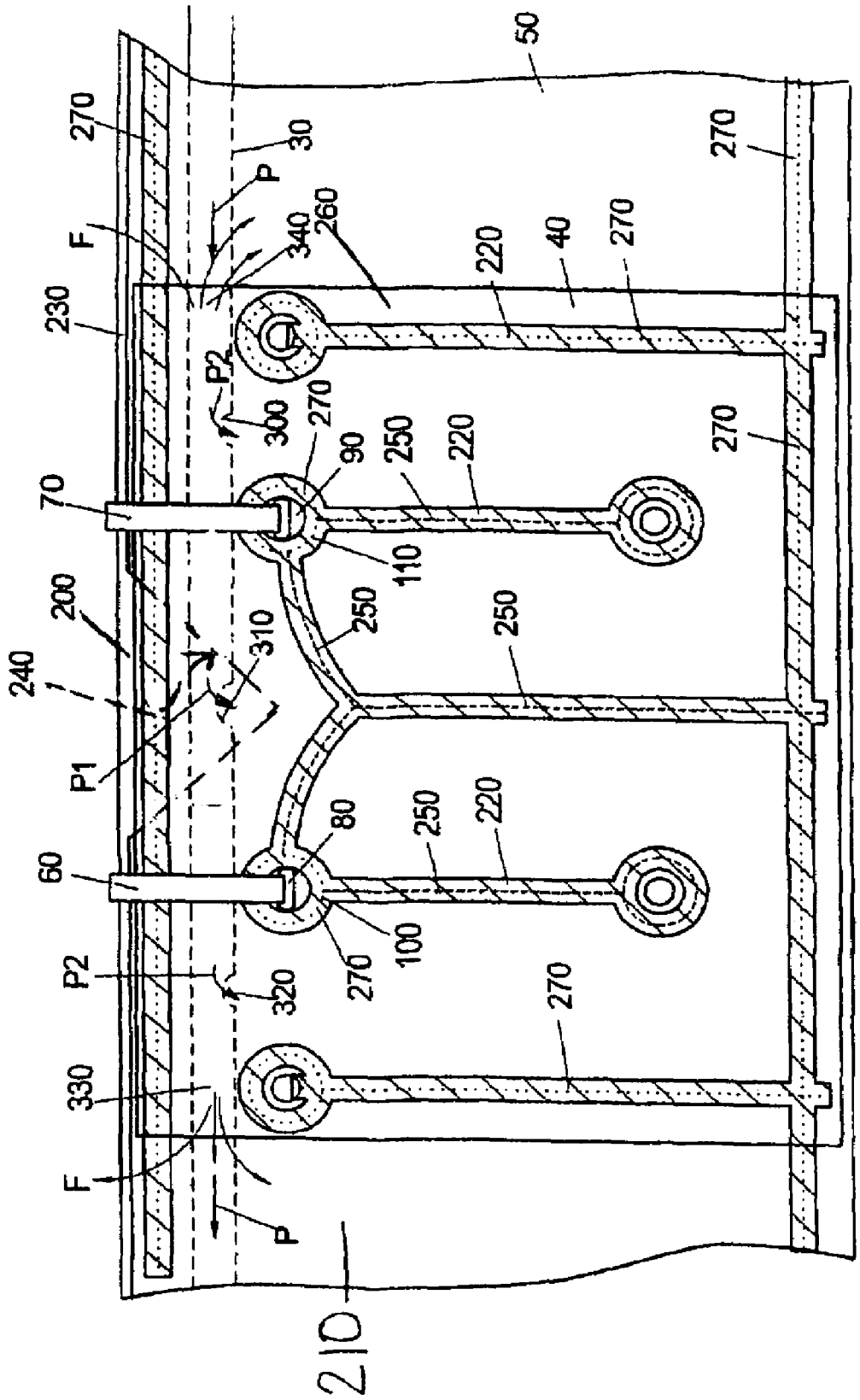
FIG. 1F shows the gas stream in the lateral airbag device according to FIG. 1A.

The filling of the two head chambers 40 and 50 with gas is shown again in detail in FIG. 1F. The arrows P show the stream of gas through the gas lance 30 and the gas passage through the gas outlet openings 300, 310 and 320 (P1: gas stream into the first head chamber, P2: gas stream into the second head chamber). Furthermore, an arrow P' in FIG. 1F indicates that the gas flow through the gas lance 30 could lead to further gas outlet openings (not illustrated specifically) which are used to fill the second head chamber 50.

As can also be seen in FIG. 1F, seams 270 with which the third material layer 260 is connected to the two other material layers 200 and 210 are not present in two regions 330 and 340 of the third material layer 260. Gastight insulation of the third material layer 260 is therefore not formed in said regions, and so gas can exit from the first head chamber 40 formed by the third material layer 260 and the second material layer 210. This gas stream to the outside is indicated in FIG. 1F by arrows F. As a result, in contrast to the second head chamber 50 which is formed by the insulated material layer 200, 210, the first head chamber 40 is gas-permeable.

In the exemplary embodiment according to FIGS. 1A to 1F, valves are not provided in the gas lance 30, and therefore an exchange of gas between the first head chamber 40 and the second head chamber 50 can occur via the gas outlet openings 300, 310 and 320. As a result, gas from the otherwise gastight second head chamber 50 can exit via the two gas exit openings 300 and 320 in the central gas exit opening 310 of the gas lance 30 into the first head chamber 40 and from there to the outside.

In order to avoid such a loss of gas from the second head chamber 50, according to a second exemplary embodiment a valve 350 is provided in the gas lance 30 and can prevent a gas stream from the gas lance 30 through the gas outlet opening 310. The valve 350 is configured in a controllable manner and, in the blocking state, acts bi-directionally and, in the pass-through state, acts uni-directionally. This means that the valve 350 prevents a gas stream in the direction of the first head chamber 40 and in the reverse direction in the blocking state; in the pass-through state, a gas stream is possible only from the gas lance 30 into the first head chamber 40, but not in reverse. The activation of the controllable valve 350 takes place, for example, as a function of gas pressure: for example, the valve 350 can be switched off and a gas flow into or out of the first head chamber 40 prevented as soon as a predetermined gas pressure is reached in the first head chamber 40 or when the gas pressure in the gas lance 30 falls below a predetermined minimum pressure. Both measures ensure that an undesirable exit of gas out of the second head chamber 50 through the first head chamber 40 to the outside cannot occur.

Figure 8:
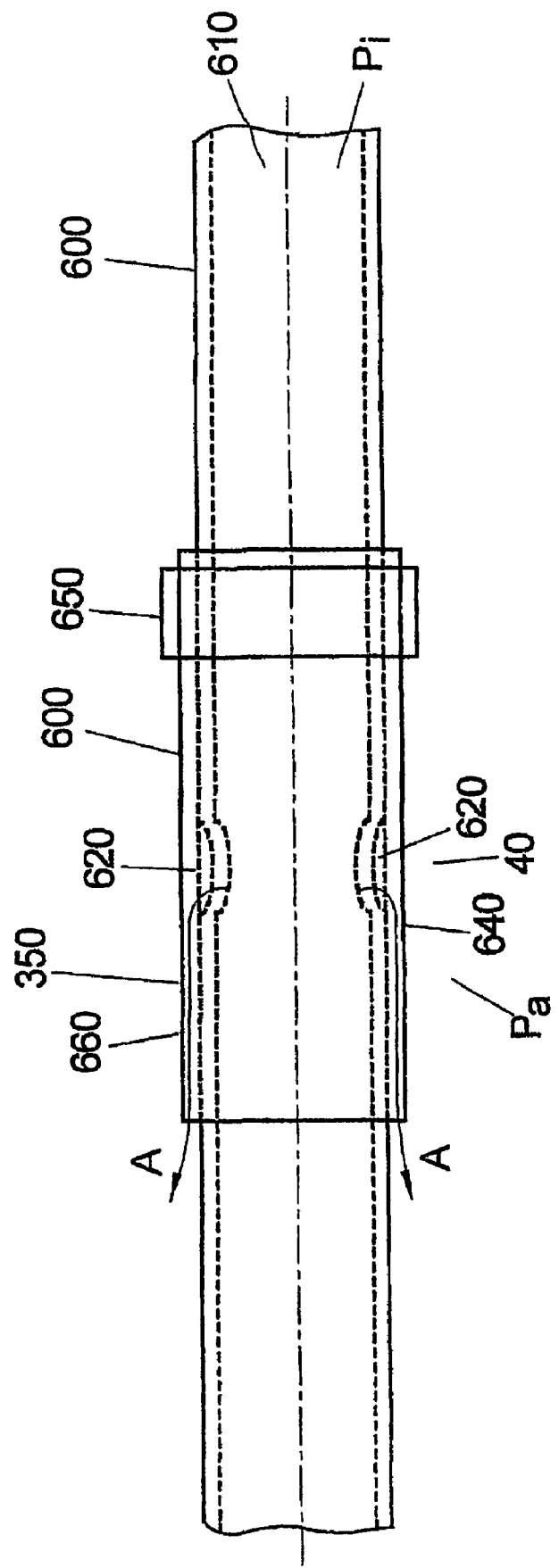
FIG. 8 shows an exemplary embodiment of a valve for the exemplary embodiments according to FIGS. 1A to 7C.

A specific exemplary embodiment of the valve 350 is explained in conjunction with FIG. 8.

Figure 3A:
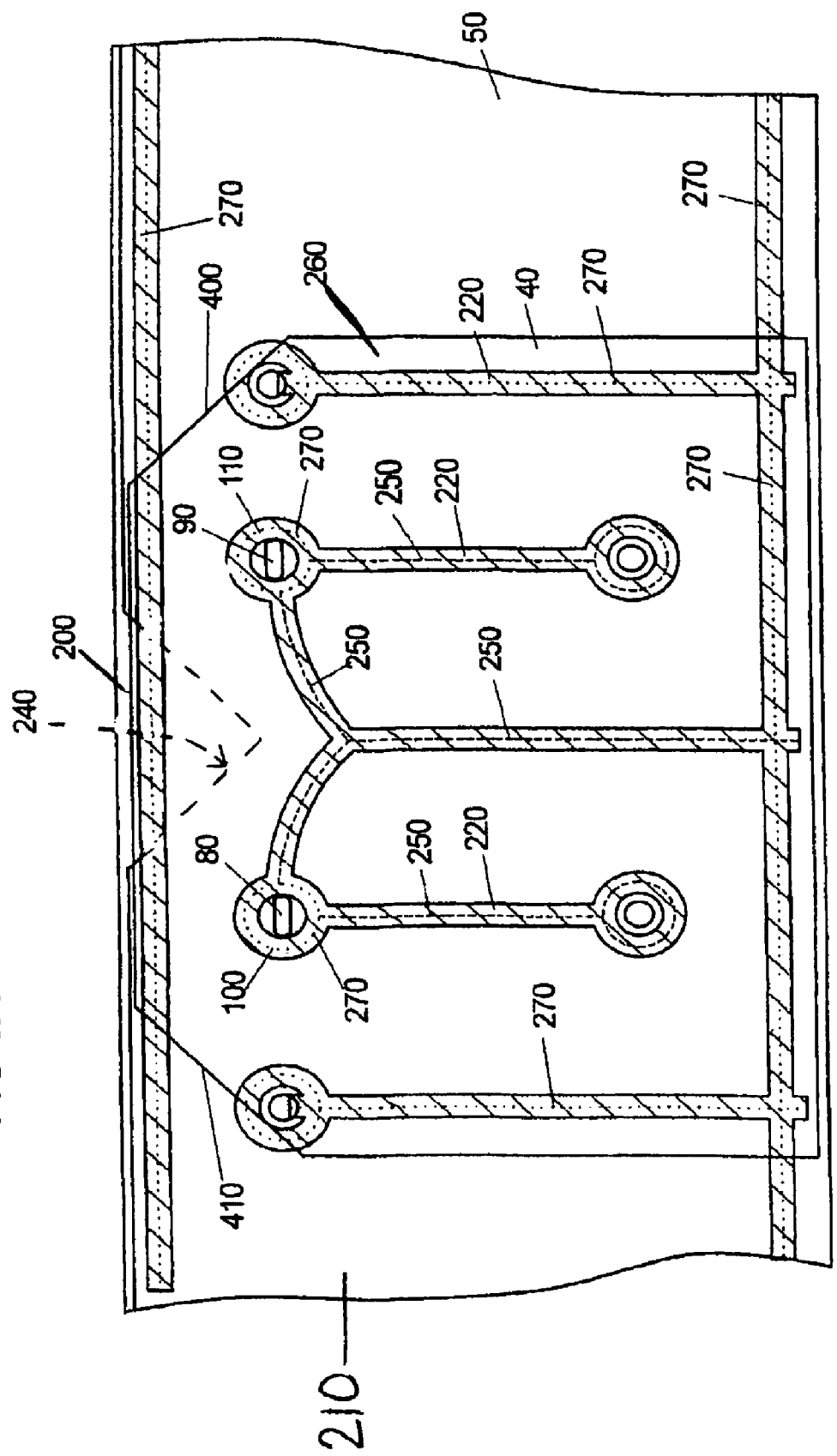

A third exemplary embodiment of a lateral airbag device is described below with reference to FIGS. 3A and 3B. In this case, FIG. 3A shows a first material layer 200 and a second material layer 210 which are connected to each other as has already been explained in conjunction with FIGS. 1A and 1C of the first exemplary embodiment. In contrast to the first exemplary embodiment, in the third exemplary embodiment the outer shape of the third material layer 260 is configured differently. Specifically, the corners of the third material layer 260, which is essentially configured in a rectangular manner, are beveled, as indicated in FIG. 3A by oblique edges 400 and 410. Otherwise, the material construction of the third exemplary embodiment corresponds to the material construction according to the first exemplary embodiment.

FIG. 3B shows the three material layers 200, 210 and 260 after the gas lance 30 has been introduced between the first material layer 200 and the second material layer 210 and the seal between the head airbag 20 and the gas lance 30 has been completed by means of the clamping straps 60 and 70.

It can also be seen in FIG. 3B that seams for sealing the third material layer 260 are not present in the region of the oblique edges 400 and 410, and therefore the discharge openings 330 and 340 already shown in conjunction with FIG. 1F are formed. Owing to the oblique profile of the edges 400 and 410, the opening cross section of the discharge openings 330 and 340 is larger than the opening cross section of the discharge openings of the first exemplary embodiment, and therefore, accordingly, the gas stream through these discharge openings 330 and 340 is greater than in the first exemplary embodiment.

Otherwise, the third exemplary embodiment corresponds to the first exemplary embodiment. Of course, in the gas lance 30 according to the third exemplary embodiment, use can also be made of the valve 350 (which was described with reference to FIG. 2 above and is further explained with reference to FIGS. 2 and 8 below), in order to prevent a gas flow from the first head chamber 40 to the second head chamber 50 or vice versa.

Figure 4A:
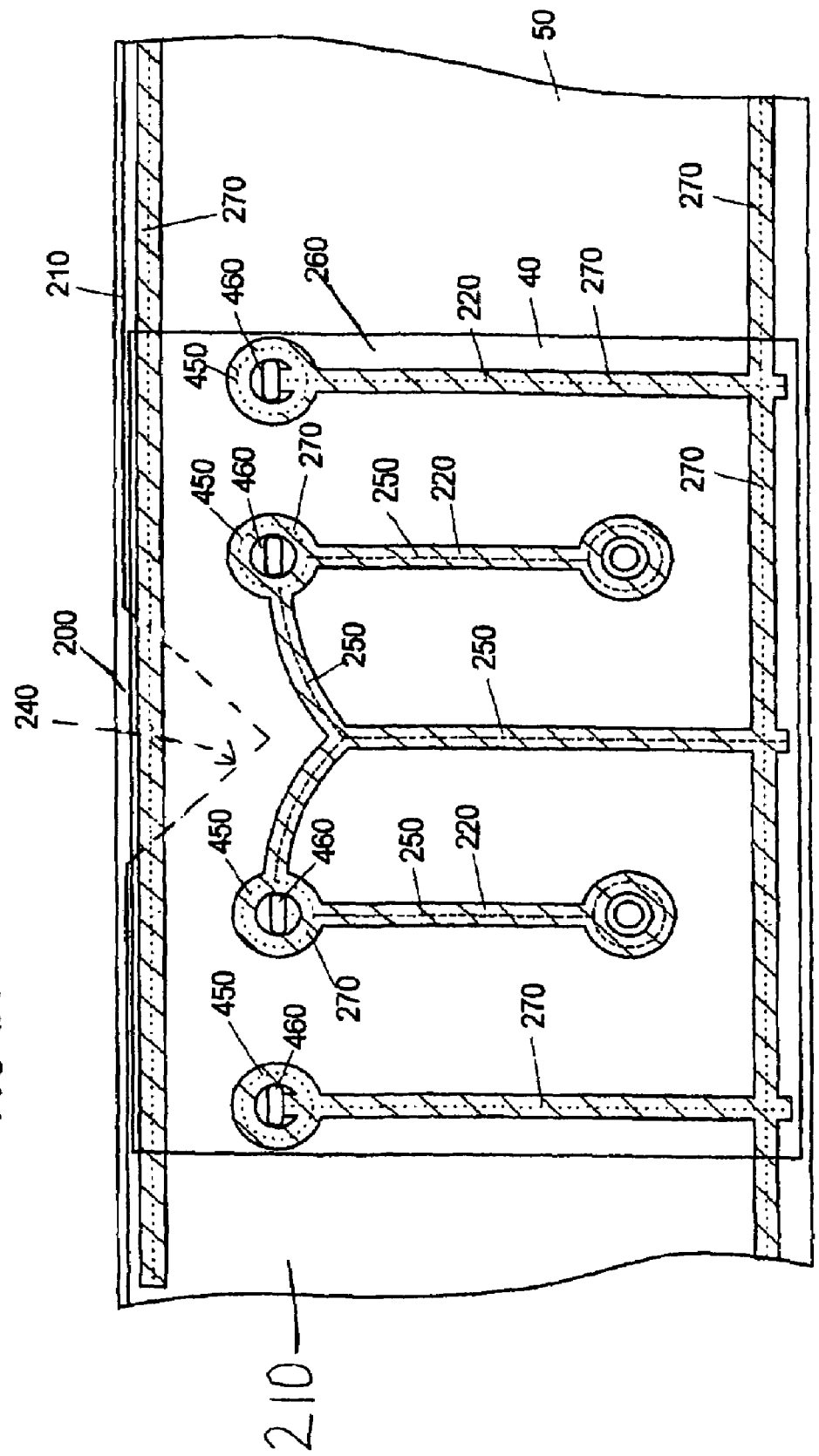

FIGS. 4A and 4B show a fourth exemplary embodiment of a lateral airbag device. In contrast to the previously explained exemplary embodiments, in this fourth exemplary embodiment there are a total of four circular seams 450 which each seal a passage hole 460. As a result, it is possible to use a total of four clamping straps 470, 470' to connect the gas lance 30 to the head airbag 20. FIG. 4B shows this in detail. Sealing of the first head chamber 40 in relation to the gas lance 30 is achieved by the two outer clamping straps 470'; discharge openings 330 and 340, as in the first three exemplary embodiments, are therefore not present. In order to achieve gas-permeability for the first head chamber 40, openings can be provided at other locations, or a gas-permeable material layer 260 can be used.

FIG. 5 shows a fifth exemplary embodiment of a lateral airbag device. This fifth exemplary embodiment differs from the third exemplary embodiment by means of the configuration of the seams 250 between the first material layer 200 and the second material layer 210. On account of the different configuration of the seams 250, a different shaping of the deployed or inflated second head chamber 50 occurs.

It can be seen in FIG. 6 that a first head chamber 40 for the first accident phase can also be arranged in the end region of the gas lance 30 (sixth exemplary embodiment). The gas outlet opening of the gas lance 30, which opening is provided for filling this first head chamber 40, is identified by the reference number 310. In order to ensure a seal between the first head chamber 40 and the gas lance 30, a clamping strap 500 is provided. In terms of function, the sixth exemplary embodiment according to FIG. 6 corresponds to the exemplary embodiments 1 to 5 already explained above.

FIGS. 7A to 7E show a seventh exemplary embodiment. It can be seen in FIG. 7A how the first and the second material layers 200, 210 are sewn to each other. It can be seen that, in contrast to the first exemplary embodiment (cf. FIG. 1C), in addition to the seams 250 according to FIG. 1C there are further circular seams 550 at which the two material layers 200 and 210 are connected.

It is seen in FIG. 7B that the third material layer 260 is sewn to the two other material layers 200 and 210 exclusively on the edge side, to be precise by means of the seams 560; in contrast to the exemplary embodiments 1 to 6, the third material layer 260 is not sewn in the region of the circular seams 550 between the first and the second material layers.

In addition, FIG. 7B shows two relatively large opening holes 570 in the third material layer 260, which are used for fastening the head airbag 20. The clamping straps 60 and 70 are pulled through these two opening holes 570 and through openings 580 in the material layers 200 and 210, which are enclosed and sealed by the circular seams 550, in order to produce a connection to the gas lance 30 (cf. FIG. 7C).

Figure 7D:
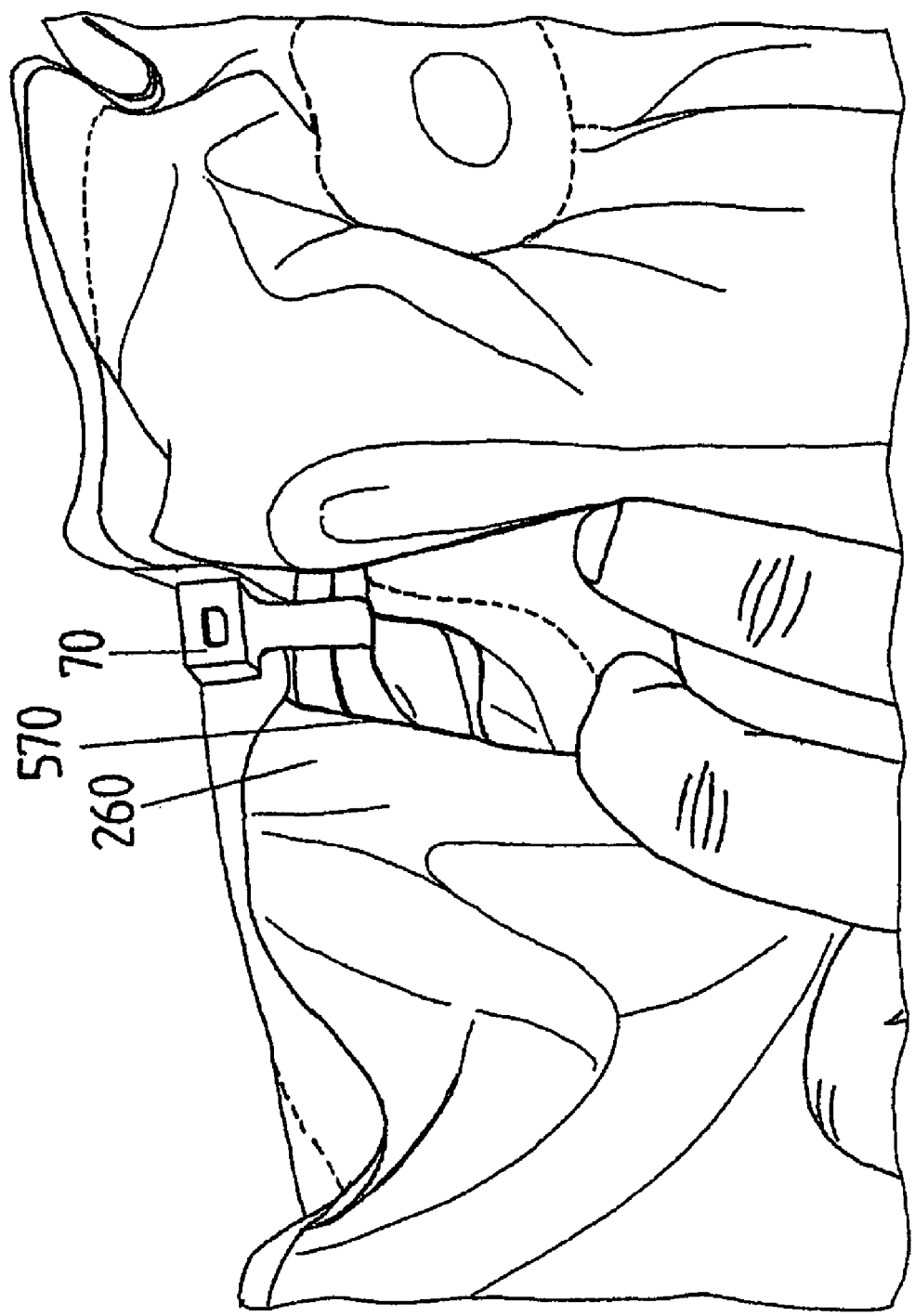

As can be seen in FIG. 7C and FIG. 7D and 7E, the connection between the third and the second material layers 260, 210 in the region of the opening holes 570 is relatively "loose", such that it is readily possible for gas to exit out of the first head chamber 40 in the region of the opening holes 570. The "gas-permeability" of the seventh exemplary embodiment is therefore significantly greater than that of exemplary embodiments 1 to 6.

An exemplary embodiment of the valve 350 according to FIG. 2 is seen in FIG. 8. The valve 350 has a pipe 600 which is formed, for example, directly by the gas lance 30 or by a separate additional pipe connected to the gas lance 30, and the inner region 610 of said pipe is connected to the gas generator (not illustrated). The pipe 600 is equipped with outflow openings 620 which are covered by a rubber tube 640. The rubber tube 640 is clamped to the pipe 600 by a clip 650, to be precise, outside the region of the outflow openings 620. The region 660 outside the outflow openings 620 that are covered by the rubber tube 640 is connected to the first head chamber 40.

The functioning of the valve 350 is as follows: if the pressure Pi within the pipe 600 exceeds a limit pressure formed by the outside pressure Pa in the first head chamber 40 and the elastic counterforce of the rubber tube 640, then the rubber tube 640 is expanded and the gas can exit out of the outflow opening 620 into the outer region 660; this is indicated in FIG. 8 by arrows A. If the pressure Pi within the pipe 600 drops below the limit pressure, the rubber tube 640 closes the covered outflow openings 620 and an exit of gas is prevented. The valve 350 is therefore "pressure-controlled". Furthermore, only one gas flow direction is possible, namely from the pipe interior into the pipe exterior, since the covered outflow openings 620 are closed by the rubber tube 640 when there is a greater pressure Pa outside the pipe 600 than within the pipe.

Germany Priority Application 10 2004 058 564.4, filed Dec. 3, 2004, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A lateral airbag device for a vehicle comprising a head airbag which, in the event of an accident of the vehicle, brings about lateral impact protection for a vehicle occupant's head, the head airbag comprising:
    at least two head chambers,
        wherein a first head chamber is configured to brake an accident-induced movement of the head,
        wherein a second head chamber is fastened to the first head chamber such that the second head chamber supports the first head chamber,
        wherein the first head chamber is more gas-permeable than the second head chamber, and
        wherein the first and second head chambers are connected to a single gas lance in such a manner that gas outlet openings of the gas lance are assigned either to the first or the second head chamber.

2. The lateral airbag device as claimed in claim 1, wherein, in an event of an accident, the first head chamber is deployed, facing the head, in such a manner that, in the event of an accident, the head plunges directly into the first head chamber, and the second head chamber is deployed facing away from the head.

3. The lateral airbag device as claimed in claim 2, wherein the second head chamber is arranged and configured such that, in a second accident phase following a first accident phase, the second head chamber provides lateral shielding of the head.

4. The lateral airbag device as claimed in claim 1, wherein in the event of an accident, the first head chamber is deployed facing away from the head, and the second head chamber is deployed, facing the head, in such a manner that, in the event of an accident, the head plunges into the second head chamber.

5. The lateral airbag device as claimed in claim 4, wherein the second head chamber is arranged and configured such that in a second accident phase following the first accident phase, the second head chamber provides lateral shielding of the head.

6. The lateral airbag device as claimed in claim 1, wherein the first head chamber is gas-permeable and the second head chamber is impermeable to gas.

7. The lateral airbag device as claimed in claim 1, wherein the first head chamber includes discharge openings which permit a gas flow to the outside.

8. The lateral airbag device as claimed in claim 1, wherein the first and second head chambers are filled separately with gas and are separated in gas flow.

9. The lateral airbag device as claimed in claim 1, wherein the gas lance is composed of a fabric material.

10. The lateral airbag device as claimed in claim 1, wherein the head airbag is formed from three material layers.

11. The lateral airbag device as claimed in claim 10, wherein a first material layer and a second material layer are connected to each other and form the second head chamber, and wherein a third material layer is connected to the second material layer to form the first head chamber.

12. The lateral airbag device as claimed in claim 11, wherein the third material layer is gas-permeable.

13. The lateral airbag device as claimed in claim 11, wherein the third material layer is essentially rectangular.

14. The lateral airbag device as claimed in claim 11, wherein the gas lance is arranged between the first and the second material layer, and a gastight connection between the second head chamber and the gas lance takes place by a clamping connection.

15. The lateral airbag device as claimed in claim 1, wherein an outer shape of the deployed first head chamber is influenced by at least one clamping strap.

16. The lateral airbag device as claimed in claim 15, wherein the at least one clamping strap is fitted on the outside or inside of the first head chamber.

17. A lateral airbag device for a vehicle comprising a head airbag which, in the event of an accident of the vehicle, brings about lateral impact protection for a vehicle occupant's head, the head airbag comprising:
    at least two head chambers,
        wherein a first head chamber is configured to brake an accident-induced movement of the head,
        wherein a second head chamber is fastened to the first head chamber such that the second head chamber supports the first head chamber,
        wherein the first head chamber is more gas-permeable than the second head chamber,
        wherein the head airbag is formed from three material layers, wherein a first material layer and a second material layer are connected to each other and form the second head chamber, and wherein a third material layer is connected to the second material layer to form the first head chamber, and
        wherein the second material layer has, along a side edge connected to the first and to the third material layer, at least one material cutout which permits a gas flow to the first head chamber from a gas lance located between the first and the second material layer.

18. The lateral airbag device as claimed in claim 17, wherein the material cutout is shaped in a form of a V.

19. A lateral airbag device for a vehicle comprising a head airbag which, in the event of an accident of the vehicle, brings about lateral impact protection for a vehicle occupant's head, the head airbag comprising:
    at least two head chambers,
        wherein a first head chamber is configured to brake an accident-induced movement of the head,
        wherein a second head chamber is fastened to the first head chamber such that the second head chamber supports the first head chamber,
        wherein the first head chamber is more gas-permeable than the second head chamber,
        wherein the head airbag is formed from three material layers, wherein a first material layer and a second material layer are connected to each other and form the second head chamber, and wherein a third material layer is connected to the second material layer to form the first head chamber,
        wherein the third material layer is essentially rectangular, and
    further comprising discharge openings formed in a region of two corners of the rectangular third material layer.

20. The lateral airbag device as claimed in claim 19, wherein the two corners are beveled.

* * * * *